(12) United States Patent
Kang et al.

(10) Patent No.: US 8,077,362 B2
(45) Date of Patent: Dec. 13, 2011

(54) IMAGE SCANNING DEVICE AND MULTIFUNCTION APPARATUS HAVING THE SAME

(75) Inventors: Kyung-pyo Kang, Suwon-si (KR); Yong-sung Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 928 days.

(21) Appl. No.: 12/033,310

(22) Filed: Feb. 19, 2008

(65) Prior Publication Data

US 2009/0002780 A1    Jan. 1, 2009

(30) Foreign Application Priority Data

Jun. 26, 2007  (KR) .............................. 10-2007-62768

(51) Int. Cl.
*H04N 1/04* (2006.01)
(52) U.S. Cl. ........ 358/497; 358/486; 358/474; 358/501; 73/760
(58) Field of Classification Search .................. 358/474, 358/497, 486, 461, 505, 501, 1.5, 468, 494; 73/760
See application file for complete search history.

(56) References Cited

U.S. PATENT DOCUMENTS

| | | | | |
|---|---|---|---|---|
| 6,134,027 A * | 10/2000 | Lee | ................................ | 358/474 |
| 7,307,409 B2 * | 12/2007 | Dams | ............................ | 324/71.1 |
| 7,375,859 B2 * | 5/2008 | Kim | ................................ | 358/461 |
| 7,672,025 B2 * | 3/2010 | Luo | ................................ | 358/486 |
| 7,764,407 B2 * | 7/2010 | Poole | ............................ | 358/474 |
| 7,772,802 B2 * | 8/2010 | Manico et al. | ................ | 320/108 |
| 7,834,759 B2 * | 11/2010 | Charlier et al. | .......... | 340/539.12 |
| 7,835,785 B2 * | 11/2010 | Scully et al. | ................... | 600/424 |
| 7,953,809 B2 * | 5/2011 | Lau et al. | ....................... | 709/206 |
| 7,971,487 B2 * | 7/2011 | Carlen et al. | .................... | 73/760 |
| 2003/0007197 A1 * | 1/2003 | Kim | ................................ | 358/497 |
| 2003/0090745 A1 * | 5/2003 | Kia et al. | ........................ | 358/474 |
| 2003/0103240 A1 * | 6/2003 | Silverbrook et al. | ......... | 358/1.18 |
| 2005/0196209 A1 | 9/2005 | Lyu | | |
| 2006/0074494 A1 * | 4/2006 | McFarland | ......................... | 700/1 |
| 2008/0062474 A1 | 3/2008 | Yoo | | |

FOREIGN PATENT DOCUMENTS

| | | |
|---|---|---|
| JP | 61-125273 | 6/1986 |
| JP | 2006-258910 | 9/2006 |
| KR | 10-2005-0090269 | 9/2005 |
| KR | 10-2008-0023966 | 3/2008 |

OTHER PUBLICATIONS

CN Office Action issued Jun. 2, 2011 in CN Patent Application No. 200810111534.6.
KR Office Action issued Oct. 11, 2011 in KR Patent Application No. 10-2007-0062768.

* cited by examiner

*Primary Examiner* — Negussie Worku
(74) *Attorney, Agent, or Firm* — Stanzione & Kim, LLP

(57) ABSTRACT

An image scanning device includes a main body casing, a scanning unit which is movably disposed within the main body casing, and a position indicating unit to generate position information of the scanning unit, and to wirelessly receive and display the position information.

20 Claims, 7 Drawing Sheets

IMAGE SCANNING DEVICE AND MULTIFUNCTION APPARATUS HAVING THE SAME

CROSS-REFERENCE TO RELATED APPLICATIONS

This application claims priority from Korean Patent Application No. 10-2007-0062768, filed on Jun. 26, 2007 in the Korean Intellectual Property Office, the disclosure of which is incorporated herein by reference in its entirety.

BACKGROUND OF THE INVENTION

1. Field of the Invention

An image scanning device and a multifunction apparatus having the same consistent with the present general inventive concept relate to a configuration to recognize the position of a scanning unit movable to scan an image of a target object.

2. Description of the Related Art

An image scanning device seats a predetermined target object on a transparent flat plate, and scans an image of the target object with a scanning unit moving under the flat plate. The image scanning device may be a separate device to perform only this function, or may be part of a multifunction apparatus, for example, with an image forming device forming an image on a printing medium. The multifunction apparatus scans the image, and may then form the scanned image on the printing medium.

Since the scanning unit projects a light beam to the target object to scan the image, the image scanning device is provided with a cover covering the transparent flat plate and the target object to prevent the light beam from leaking to the outside. However, since the light beam is blocked by the cover, a user is unable to recognize the position of the scanning unit as it moves. If the user is unable to recognize the current position of the scanning unit, the user is likely to open the cover before image scanning is completed, thereby causing scanning inferiority.

To solve this problem and inform the user of the current position of the scanning unit, the conventional configuration includes a light emitting body, a circuit unit driving the light emitting body, and a lens transmitting a light from the light emitting body. However, since the conventional configuration uses a cable to apply power to the light emitting body, the motion of the scanning unit is restricted thereby, and a lot of installation space is needed, thereby increasing the size of the device. Also, the light from the light emitting body interferes with the light beam from the scanning unit to cause scanning inferiority.

SUMMARY OF THE INVENTION

The present general inventive concept provides an image scanning device and a multifunction apparatus having the same to recognize the position of a scanning unit with a simple configuration.

The present general inventive concept also provides an image scanning device and a multifunction apparatus having the same to recognize a current position of a scanning unit without a separate cable configuration to apply power.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing an image scanning device, including a main body casing, a scanning unit which is movably disposed at the main body casing, and a position indicating unit to generate position information of the scanning unit, and to wirelessly receive and display the position information.

The position indicating unit may include an indicating member which is provided at one of the scanning unit and the main body casing, and forms a signal which indicates a moving position of the scanning unit.

The position indicating unit may further include a display which is provided at the other of the scanning unit and the main body casing, and wirelessly receives the signal from the indicating member to display the moving position of the scanning unit.

The display may interact with the indicating member by means of a magnetic force to display the moving position of the scanning unit.

The indicating member may include a magnet which is disposed at the scanning unit.

The display may include a guide rail which is provided at the main body casing in a moving direction of the scanning unit.

The display may further include a moving member which is formed of a magnetic material, and is attracted by the magnetic force of the indicating member to move along the guide rail.

The moving member may include a fluorescent material.

The indicating member may include a magnet which is disposed at the main body casing, and has a rod shape extending in a moving direction of the scanning unit.

The display may include a coil which is disposed at the scanning unit, and is wound around the magnet to move together with the magnet to form an induced current.

The display may further include a light source which is connected to the coil to generate a light by means of the induced current.

The image scanning device may further include a transparent window which is formed to the main body casing along a moving path of the light source.

The indicating member may include a magnet which is disposed at the scanning unit, and the display includes a magnetized sheet which is disposed at an outer side of the main body casing along a moving path of the magnet, and allows color of the position of the magnet to be changed by means of the magnetic force of the magnet.

The indicating member may include a light source which is disposed at the main body casing, and a reflecting member which is coupled to the scanning unit to reflect a light beam from the light source.

The display may include a transparent window which is formed to the main body casing along a moving path of the scanning unit so that the light beam which is reflected by the reflecting member can be imaged thereon.

The image scanning device may further include a light blocking wall which is provided at the main body casing to be interposed between the scanning unit and the reflecting member, and blocks the light beam which proceeds from the light source toward the scanning unit.

The foregoing and/or other aspects and utilities of the present general inventive concept may also be achieved by providing a multifunction apparatus, including an image forming device which forms an image on a printing medium, and an image scanning device which scans an image of a target object.

The foregoing and/or other aspects and utilities of the present general inventive concept may also be achieved by providing an image scanning device comprising a transparent plate including a first surface on which to place a document, a sensor array moveable along a second surface of the transparent plate to sense image information of a document, and a user interface positioned on an exterior of the image scanning device to wirelessly receive position information regarding a position of the sensor array and to display the position information.

The foregoing and/or other aspects and utilities of the present general inventive concept may also be achieved by providing a method of displaying a position of a sensor array of an image scanning device comprising moving the sensor array to scan a document positioned on a scanning bed with a source of electrical power received external to the scanning device, moving a device connected to the sensor array with a fixed positional relationship to generate a position signal, the device being electrically isolated from the source of electrical power, wirelessly transmitting the position signal, wirelessly receiving the transmitted position signal, and displaying a position of the sensor array as a function of the received position signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
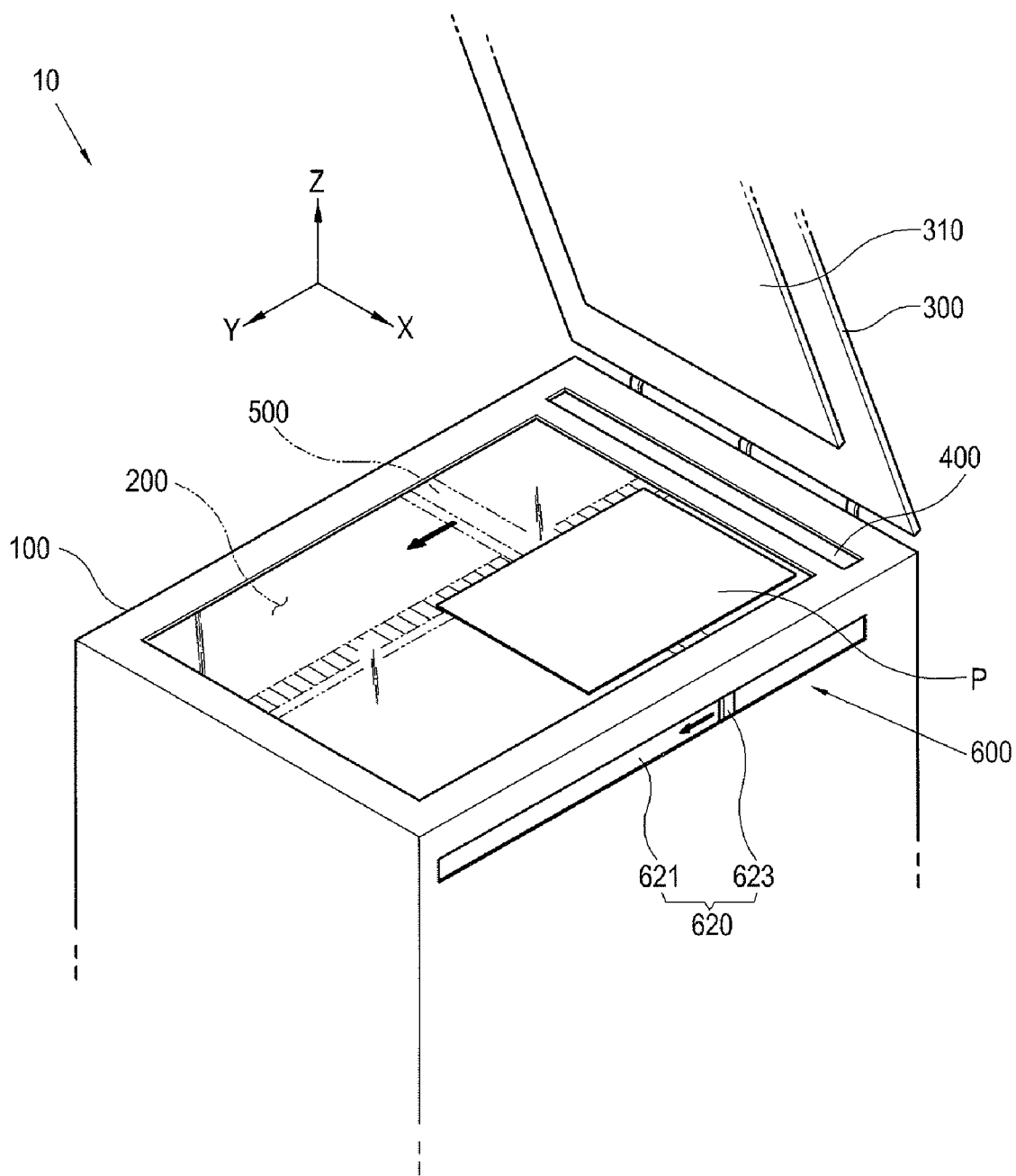
FIG. 1 is a perspective view of an image scanning device according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
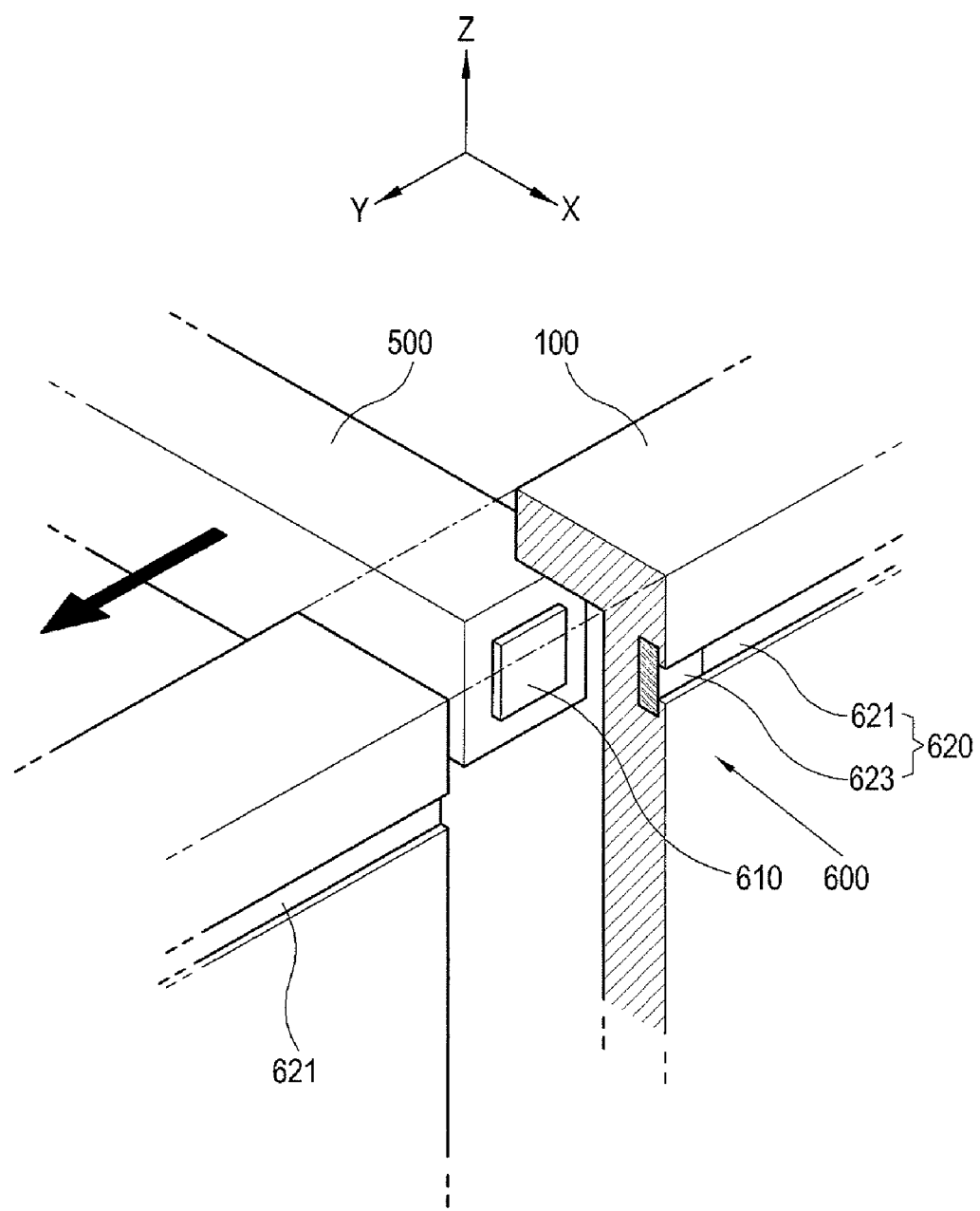
FIG. 2 is a perspective view illustrating a main portion of the image scanning device in FIG. 1.
Figure 3:
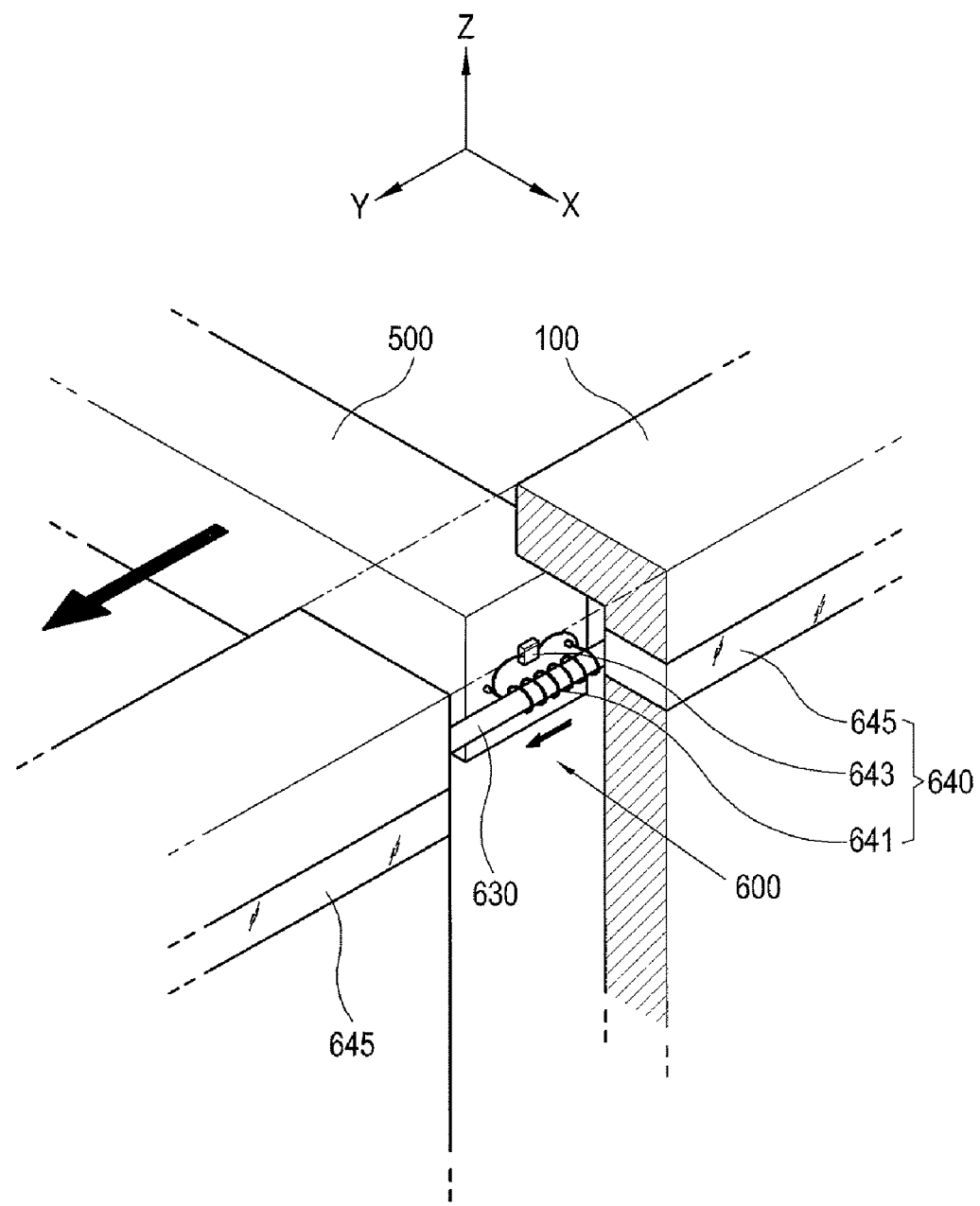
FIG. 3 is a perspective view illustrating a main portion of an image scanning device according to another exemplary embodiment of the present general inventive concept.
Figure 4:
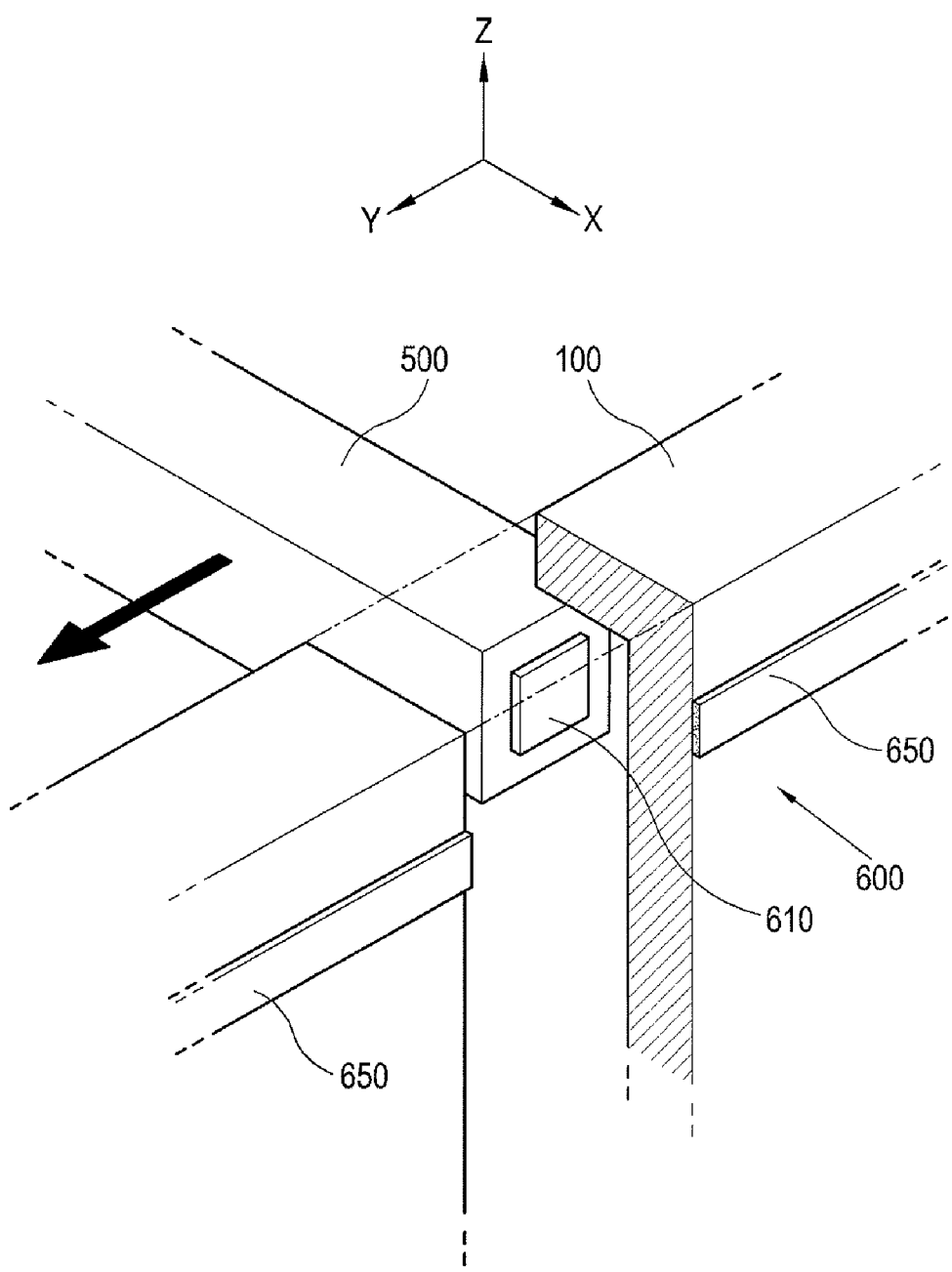
FIG. 4 is a perspective view illustrating a main portion of an image scanning device according to another exemplary embodiment of the present general inventive concept.

FIGS. 2 to 4 illustrate an area of a main body casing 100 for a convenient description of the exemplary embodiments.

As illustrated in FIGS. 1 and 2, an image scanning device 10 according to an exemplary embodiment of the present general inventive concept includes the main body casing 100, a transparent flat plate 200 provided at an upper side of the main body casing 100 so that a target object P can be seated thereon, a cover 300 rotatably coupled to the main body casing 100 to cover the transparent flat plate 200, a shading unit 400 provided at the main body casing 100 to be adjacent to the transparent flat plate 200, a scanning unit 500 moveable under the transparent flat plate 200 to scan an image of the target object P, and a position indicating unit 600 to inform a user of the position of the scanning unit 500.

Directions illustrated in the accompanying figures are described. Direction X is a direction in which the scanning unit 500 extends. Direction Y, a transverse direction to the direction X, is a direction in which the scanning unit 500 moves along the transparent flat plate 200 to perform image scanning. Direction Z is a transverse direction to the directions X and Y, and may be an upward perpendicular direction with respect to a surface of the transparent flat plate 200, and a direction of a light beam of the scanning unit 500.

The transparent flat plate 200 is disposed as an upper plate of the main body casing 100, and the target object P is seated thereon. Here, an area of the target object P to be scanned faces the transparent flat plate 200, and the scanning unit 500 projects the light beam to a lower side of the transparent flat plate 200 to scan the image of the target object P. The transparent flat plate 200 has a high transparency to prevent inferiority of the image scanning due to distortion generated when the light beam penetrates the transparent flat plate 200.

The cover 300 covers an upper plate of the main body casing 100 including the transparent flat plate 200 to prevent the light beam projected from the scanning unit 500 from leaking to the outside of the image scanning device 10. Accordingly, the image scanning inferiority of the target object P can be prevented. The cover 300 includes a white light reflecting member 310 disposed at a surface facing the transparent flat plate 200 to reflect the light beam projected from the scanning unit 500 back to the scanning unit 500.

The shading unit 400 is provided at the upper plate of the main body casing 100 to be adjacent to a side of the transparent flat plate 200. The scanning unit 500 is positioned adjacent the shading unit 400 when on standby (when the scanning unit is not performing the image scanning). The shading unit 400 is used to perform shading correction and/or white level correction of the scanning unit 500.

The scanning unit 500 has a column shape, or a drum shape extending in the X direction, and is disposed under the transparent flat plate 200 inside the main body casing 100. The scanning unit 500 may include a light source (not shown) projecting the light beam, and an optical component (not shown), and may employ a contact image sensor (CIS), a charge coupled device (CCD) or other various known devices in the art.

The scanning unit 500 starts from the shading unit 400, and moves in the Y direction under the transparent flat plate 200 to scan the image of the target object P. The scanning unit 500 returns to the shading unit 400 to be on standby after completing an image scanning process.

The position indicating unit 600 is disposed at the scanning unit 500 and the main body casing 100, and displays the position of the scanning unit 500 when moving. When the target object P is seated on the transparent flat plate 200, and the scanning unit 500 moves under the transparent flat plate 200, the cover 300 covers the target object P and the transparent flat plate 200. In this situation, a user is incapable of knowing the position of the scanning unit 500 by viewing the scanning unit 500 through the transparent flat plate 200. The position indicating unit 600 displays the position of the scanning unit 500 when moving while the cover 300 covers the transparent flat plate 200, so that the user can know the position of the scanning unit 500 during a scanning operation.

The position indicating unit 600 includes an indicating member 610 to indicate the position of the scanning unit 500, and a displaying member 620 to display the position of the indicating member 610 by means of magnetic interaction with respect to the indicating member 610. According to this exemplary embodiment, the indicating member 610 is provided as a magnet 610 disposed at the scanning unit 500. Also, the displaying member 620 includes a guide rail 621 provided at an outer side of the main body casing 100 extending along a moving direction of the scanning unit 500, and a moving member 623 attracted by the magnetic force of the magnet 610 to move along the guide rail 621.

The magnet 610 is disposed at an end part of the scanning unit 500 in the X direction, that is, in a lengthwise direction of the scanning unit 500. The magnet 610 may be provided as a permanent magnet to generate the magnetic force without being supplied with power. The magnetic force generated by the magnet 610 is provided at be able to penetrate the main body casing 100 to movably attract the moving member 623.

Since the magnet 610 is coupled to the scanning unit 500, the magnet 610 moves together with the scanning unit 500 in the Y direction. Also, since the magnet 610 is disposed at the end of the scanning unit 500, the position of the magnet 610 is regarded as the position of the scanning unit 500. Accordingly, by displaying the position of the magnet 610, the user can be informed of a current position of the scanning unit 500 as it moves.

The guide rail 621 within the main body casing 100 extends along a moving path of the magnet 610. The guide rail 621 is provided at a side surface of the main body casing 100 corresponding to the moving path of the magnet 610 so that the user can easily know the position of the scanning unit 500. Alternatively, the guide rail 621 may be disposed elsewhere.

The guide rail 621 accommodates the moving member 623, and guides the motion of the moving member 623. The guide rail 621 is provided at an outer side of the main body casing 100 extending in the Y direction and located in the X direction within a range in which the magnetic force of the magnet 610 penetrates the main body casing 100 to have an effect on the moving member 623. Accordingly, the moving member 623 can be attracted by the magnetic force of the magnet 610 with the main body casing 100 interposed therebetween to move along the guide rail 621, and the user can know the position of the moving member 623.

The guide rail 621 has a length in the Y direction not shorter than a maximum moving distance of the scanning unit 500 in the Y direction. Accordingly, the moving member 623 can move to correspond to any position of the magnet 610.

Various surface treatments may be applied to the guide rail 621 to reduce friction forces applied to the contact surface of the moving member 623 so that the moving member 623 can smoothly move. Also, an area of the guide rail 621 in the X direction may be opened, or alternatively covered by a transparent widow so that the user can know the position of the moving member 623.

The moving member 623 is accommodated at the guide rail 621, and is guided by the guide rail 621 to move. Since the moving member 623 is formed of a magnetic material, the moving member 623 is attracted by the magnetic force of the magnet 610 to move. Since the moving member 623 moves to correspond to the magnet 610 moving in the Y direction, the position of the moving member 623 corresponds to the position of the magnet 610 and the scanning unit 500 in the Y direction. Accordingly, the position of the scanning unit 500 is indicated by the position of the moving member 623.

The moving member 623 may have various shapes. For example, a first area of the moving member 623 facing the magnet 610, that is, a first area attracted by the magnetic force of the magnet 610, may have a predetermined volume to be easily attracted by the magnetic force. Also, a second area of the moving member 623 recognized by the user may have a slide bar shape having a narrow width so that the user can easily recognize the position of the moving member 623.

A fluorescent material may be applied to all or part of a surface of the moving member 623 to clearly display the position thereof. Accordingly, the user can easily recognize the position of the moving member 623.

The moving member 623 and/or guide rail 621 may have other various configurations to accomplish the purpose thereof. For example, the moving member 623 may be provided as a transparent capsule, a side of which is coupled with a magnetic substance. Since the moving member 623 includes the magnetic substance, the moving member 623 is attracted by the magnetic force of the magnet 610 to move along the guide rail 621. Also, the transparent capsule may be filled, inside thereof, with a fluorescent liquid, a piece of light-reflecting paper, water, etc. to enhance attention of the user. As another example, the moving member 623 may be provided as a ball or cylinder to roll along the guide rail to reduce the effect of frictional forces.

Hereinafter, a displaying process of the position of the scanning unit 500 in the image scanning device 10 according to an exemplary embodiment of the present general inventive concept will be described by referring to FIGS. 1 and 2.

The target object P is seated on the transparent flat plate 200 with the cover 300 opened with respect to the transparent flat plate 200. Here, the area of the target object P to be scanned faces the transparent flat plate 200.

The target object P and the transparent flat plate 200 are covered by the cover 300 and then the image scanning starts. The scanning unit 500 positioned adjacent to the shading unit 400 moves in the Y direction, and projects the light beam at the target object P through the transparent flat plate 200 to scan the image thereof.

As the scanning unit 500 moves, the magnet 610 disposed at an end part of the scanning unit 500 also moves in the Y direction. The magnetic force of the magnet 610 penetrates the main body casing 100 to have an effect on the moving member 623. Here, since the main body casing 100 is interposed between the magnet 610 and the moving member 623, the light beam from the scanning unit 500 is prevented from leaking to the outside, and any external light is prevented from being introduced to an inner part of the main body casing 100. Accordingly, the image scanning inferiority due to interference of the light beam can be prevented.

The magnetic force of the magnet 610 has an effect on the moving member 623, and the moving member 623 is guided by the guide rail 621 to move in the direction Y according to the movement of the magnet 610. Since the moving member 623 moves to correspond to the magnet 610, the position of the moving member 623 corresponds to the position of the magnet 610 and the scanning unit 500.

Accordingly, the user can be informed of the position of the moving member 623, thereby recognizing the position of the scanning unit 500 in moving in real-time.

Another exemplary embodiment of the present general inventive concept employs a configuration of a position indicating unit 600 different from the configuration of the above exemplary embodiment of the present general inventive concept.

As illustrated in FIG. 3, in the position indicating unit 600 of an image scanning device 10 according to this exemplary embodiment of the present general inventive concept, an indicating member 630 is provided as a rod shape magnet 630 disposed at a main body casing 100 to extend in a moving direction of a scanning unit 500. Also, a displaying member 640 includes a coil 641 disposed at the scanning unit 500 and wound around the rod shape magnet 630 to move along the rod shape magnet 630 to form an induced current, a light source 643 connected to the coil 641 to generate a light by means of the induced current, and a transparent window 645 disposed at the main body casing 100 along a moving path of the light source 643.

The rod shape magnet 630 is disposed inside the main body casing 100 to be adjacent to an end part of the scanning unit 500 in the X direction. The rod shape magnet 630 extends in the moving direction of the scanning unit 500, that is, in the Y direction. Accordingly, regardless of the position of the scanning unit 500, a distance in the X direction between the end part of the scanning unit 500 and the rod shape magnet 630 can be maintained.

The coil 641 is disposed at an end part of the scanning unit 500 in the X direction, and is wound around the rod shape magnet 630 several times. As the scanning unit 500 moves, the coil 641 moves in a lengthwise direction of the rod shape magnet 630 while being wound around the rod shape magnet 630. Accordingly, an induced current is generated in the coil 641 as the coil moves through the magnetic field of the rod shape magnet 630. The material, diameter, number of winding turns and distance from the rod shape magnet 630 of the coil 641 are not limited, and may be variously chosen so that an induced current is generated within the coil 641 as the coil 641 moves along the rod shape magnet 630.

The light source 643 is disposed at the end part of the scanning unit 500 in the direction X, and is electrically connected to the coil 641. The induced current generated within the coil 641 is transmitted to the light source 643, and the light source 643 generates the light. Since the light source 643 moves together with the scanning unit 500, the position of the light source 643 can be recognized as the position of the scanning unit 500 in the Y direction. The configuration of the light source 643 is not limited, and various configurations may be used, such as a light emitting diode (LED).

The transparent window 645 is disposed at the main body casing 100 and extends along the Y direction, and passes the light from the light source 643 to the outside of the main body casing 100. Accordingly, a user can recognize the position of the light source 643 and thus the scanning unit 500 due to the light leaking through the transparent window 645.

As the coil 641 wound around the rod shape magnet 630 moves along the rod shape magnet 630, the induced current is generated in the coil 641. Also, the light source 643 generates the light by using the generated induced current to display the position of the scanning unit 500. This configuration does not need a separate power supplying circuit and power supplying cable to drive the position indicating unit 600. Accordingly, the configuration can be simplified, and manufacturing costs can be reduced.

Another exemplary embodiment of the present general inventive concept employs a configuration of a displaying member 650 different from the configuration of the other embodiments of the present general inventive concept.

As shown in FIG. 4, in a position indicating unit 600 of an image scanning device 10 according to this exemplary embodiment of the present general inventive concept, an indicating member 610 is provided with the same magnet as the previous exemplary embodiment of the present general inventive concept, and the displaying member 650 includes a sheet disposed at an outer side of the main body casing 100 along a moving path of the magnet 610, and allowing the position of the magnet 610 to be recognized by color change of the displaying member 650 by the magnetic force of the magnet 610.

The displaying member 650 is a sheet elongated in the Y direction, and installed at an outer side of the main body casing 100. If a predetermined magnetic force is applied to an area of the displaying member 650, the area thereof is magnetized to change the color thereof. If the magnetic force is removed, the changed color of the area returns to an original color.

The displaying member 650 is disposed along the moving path of the magnet 610 within a range in which the magnetic force of the magnet 610 can have an effect on the displaying member 650. As the magnet 610 moves, the area of the displaying member 650 on which the magnetic force of the magnet 610 has an effect continuously changes, the color of the displaying member 650 is changed and restored continuously along the direction Y. Accordingly, by recognizing the color-changed position of the displaying member 650, a user can recognize the position of the magnet 610 and the scanning unit 500.

The position indicating unit 600 of the disclosed embodiments may employ other various configurations within the principles of the present general inventive concept. For example, a guide rail 621 may be provided as a transparent capsule elongated in the direction Y, an inside of the capsule may be filled with liquid such as water, etc., and a moving member 623 may be disposed inside the guide rail 621. Accordingly, the moving member 623 can smoothly move in the filled liquid.

Also, the inside of the guide rail 621 may be filled with liquid and a magnetic powder. Since the magnetic powder freely moves in the liquid to be concentrated on a position to which the magnetic force is applied, the user can recognize the position of the magnetic 610 and the scanning unit 500 by recognizing the position of the concentrated magnetic powder.

Another exemplary embodiment of the present general inventive concept employs configurations of an indicating member 660 and a displaying member different from the configuration of the exemplary embodiments of the present general inventive concept described above.

Figure 6:
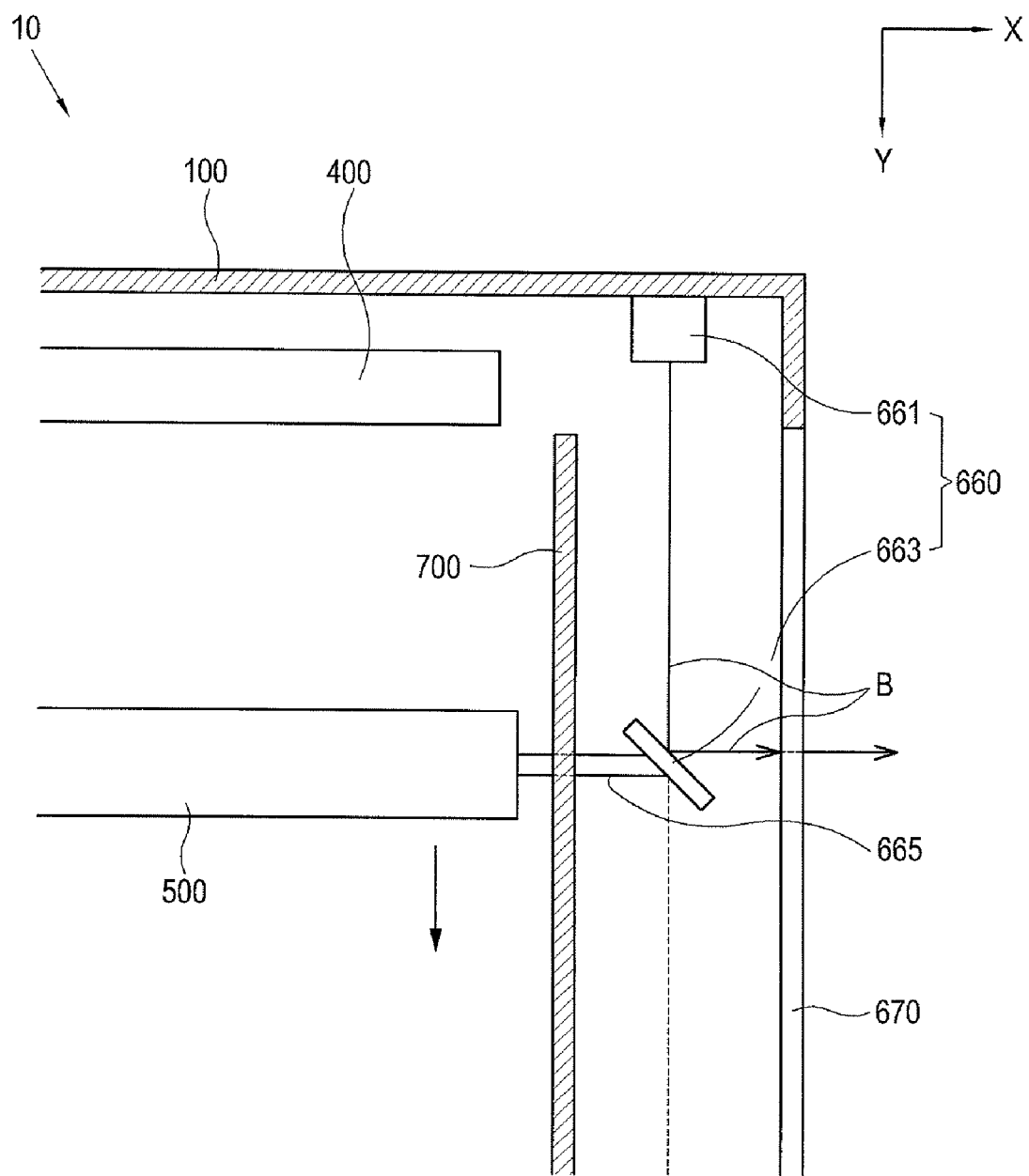
FIG. 6 is a side sectional view of a main portion of an image scanning device according to another embodiment of the general inventive concept.
Figure 7:
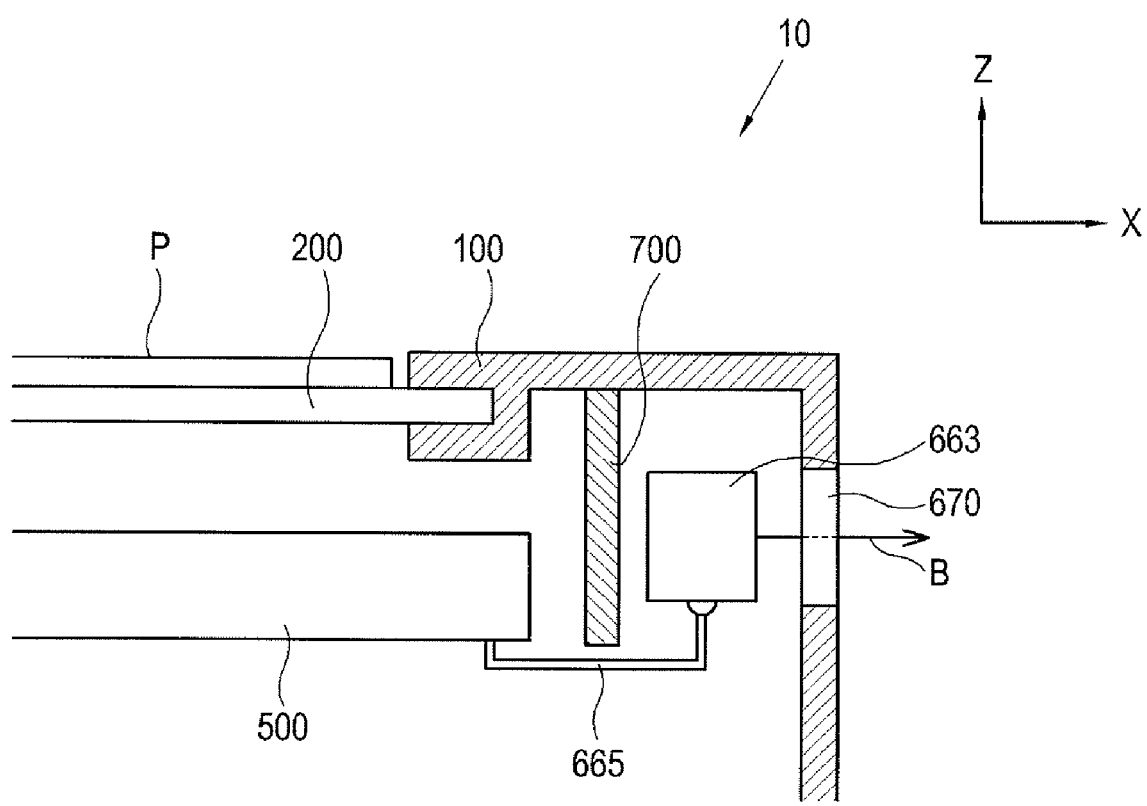
FIG. 7 is a plan view of the image scanning device of FIG. 6.

As shown in FIGS. 6 and 7, in a position indicating unit 600 of an image scanning device 10 according to this exemplary embodiment of the present general inventive concept, the indicating member 660 includes a light source 661 disposed at a main body casing 100, and a reflecting member 663 coupled to an end part of a scanning unit 500, and the displaying member includes a transparent window 670 formed to a side surface of the main body casing 100 along a moving path of the scanning unit 500. Also, a light blocking wall 700 is further provided at the main body casing 100 to be interposed between the scanning unit 500 and the reflecting member 663 to block a light beam B proceeding from the light source 661 toward the scanning unit 500.

The light source 661 is disposed at an area offset from the moving path of the scanning unit 500, for example, to an inner side of the main body casing 100 to be adjacent to an end part of the shading unit 400 in the lengthwise direction of the shading unit 400. The light source 661 generates and projects the light beam B to a space formed between an end part of the scanning unit 500 and the transparent window 670 in the moving direction of the scanning unit 500. Accordingly, the light beam B from the light source 661 to reflecting member 663 has a light path in parallel with the moving path of the end part of the scanning unit 500.

The light beam B may become diffused as it travels from the light source 661. With a consideration of the diffusion of the light beam B, a lens (not shown) collecting the light beam B may be disposed on the light path.

The light source 661 is supplied with power to generate the light beam B. Since the light source 661 is disposed at the main body casing 100, a cable, etc. to supply the power oes not interfere with the movement of the scanning unit 500.

The reflecting member 663 is disposed at an end part of the scanning unit 500, and reflects the light beam B from the light source 661 to the transparent window 670. The reflecting member 663 moves along the light path of the light beam B by moving together with the scanning unit 500.

The light beam B reflected by the reflecting member 663 penetrates the transparent window 670 or is imaged thereon. The reflecting member 663 may be disposed rotatable with respect to the scanning unit 500 so that the light beam B can be properly transmitted to and through the transparent window 670. Accordingly, the position of the transparent window 670 may have a greater freedom when designing the image forming apparatus. Accordingly, the reflecting member 663 can adjust a reflecting angle of the light beam B.

The reflecting member 663 may have a concave mirror configuration concentrating the light beam B, or a convex mirror configuration dispersing the light beam B so that a user can easily recognize the light beam B. Alternatively, the reflecting member 663 may have a flat mirror configuration.

The transparent window 670 is disposed at the main body casing 100 along a moving path of the reflecting member 663. The light beam B reflected by the reflecting member 663 penetrates the transparent window 670 or is imaged thereon, and the user recognizes the position of the scanning unit 500 by recognizing the position of the light beam B imaged on the transparent window 670 from the outside of the scanning unit 500. The transparent window 670 may be substantially fully transparent (e.g., clear glass) or partially transparent (e.g., colored glass). Alternatively, the transparent window may be replaced with a window made of a translucent material which diffuses the light beam B.

The light blocking wall 700 is interposed between the reflecting member 663 and an end part of the scanning unit 500 along the moving path of the scanning unit 500. Accordingly, by blocking a space between the light path of the light beam B and the scanning unit 500, the light blocking wall 700 prevents the light beam B from being introduced to the scanning unit 500 to interfere with the image scanning of the scanning unit 500. The light blocking wall 700 downwardly extends from a lower surface of an upper plate of the main body casing 100, and the reflecting member 663 is supported to the scanning unit 500 by means of a supporting bracket 665 not to interfere with the light blocking wall 700. As illustrated in FIG. 7, the supporting bracket extends around the light blocking wall. Alternatively, the supporting bracket may extend through a slot in the light blocking wall. Accordingly, the light blocking wall 700 does not interfere with the movement of the scanning unit 500 and the reflecting member 663.

As described above, the light source 661 forms the light beam B, and projects the light beam B along the moving direction of the scanning unit 500. Also, the reflecting member 663 supported to the scanning unit 500 is disposed on the light path of the light beam B. The light beam B is reflected by the reflecting member 663 moving together with the scanning unit 500 to be imaged on the transparent window 670, thereby displaying the position of the scanning unit 500.

Figure 5:
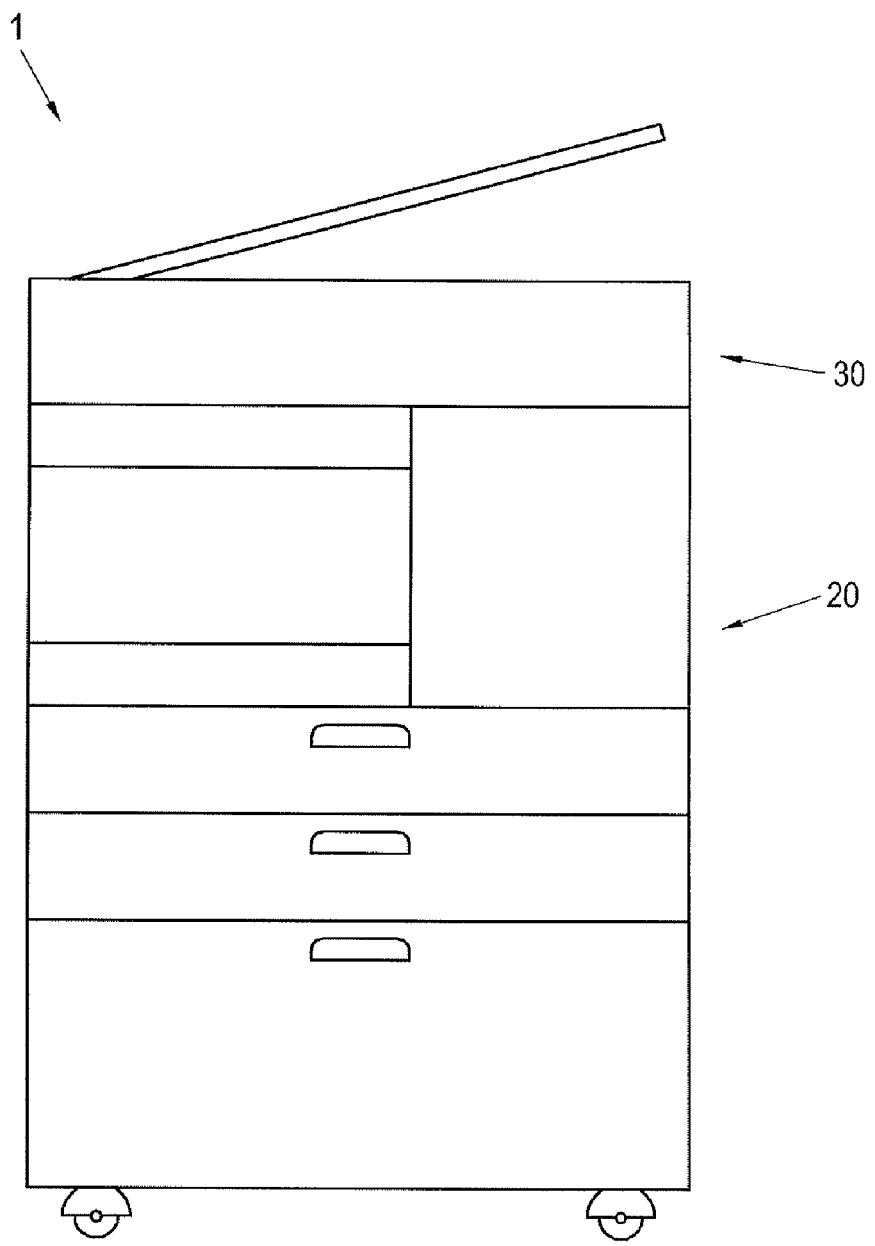
FIG. 5 is a schematic view illustrating a multifunction apparatus employing an image scanning device according to an exemplary embodiment of the present general inventive concept.

FIG. 5 is a schematic view illustrating a multifunction apparatus 1 according to an exemplary embodiment of the present general inventive concept. The multifunction apparatus 1 according to the exemplary embodiment of the present general inventive concept includes an image forming device 20 forming an image on a printing medium, and an image scanning device 30 scanning an image of a target object P. The multifunction apparatus 1 allows the image forming device 20 to form the image scanned by the image scanning device 30 on a printing medium. Here, the image scanning device 30 may have the same configuration as the image scanning device 10 according to the exemplary embodiments of the present general inventive concept described above by referring to FIGS. 1 to 4, 6 and 7.

As described above, an image scanning device and a multifunction apparatus allows a current position of a scanning unit to be recognized when a cover is closed, thereby improving convenience of a user.

Also, an image scanning device and a multifunction apparatus having the same may avoid use of a separate cable and circuit configuration for applying power, enabling the device and the apparatus to be compact, thereby reducing manufacturing cost and improving productivity.

Also, an image scanning device and a multifunction apparatus having the same minimizes and/or reduces interference with image scanning of a scanning unit while allowing a current position of a scanning unit to be recognized, having a simple configuration, thereby improving reliability of a product.

In an embodiment, the main body of the scanning unit 500 reads an image of the target object P by emitting the light beam to the target object P and moving to the reading position of the target object P, but is not limited thereto. Alternatively, embodiments herein may be applied to a mirror-type scanning unit in which a reflective mirror (not shown) for reflecting and transferring the light beam to the main body of the scanning unit 500 moves to the reading position of the target object P while the main body of the scanning unit 500 remains stationary or moves partially. Accordingly, the scanning unit according to an embodiment of the present invention comprises the main body of the scanning unit 500 and also a light transfer mirror (not shown) and so on, used for transferring the read data from the target object P to the main body of the scanning unit 500 in the scanning process.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An image scanning device, comprising:
    a main body casing;
    a scanning unit which is movably disposed at the main body casing; and
    a position indicating unit to wirelessly determine a position of the scanning in response to moving the scanning unit in the main body casing and to display position information of the scanning unit received wirelessly based on the determined position.

2. The image scanning device according to claim 1, wherein the position indicating unit comprises an indicating member which is provided to at least one of the scanning unit and the main body casing, and forms a signal which indicates a position of the scanning unit.

3. The image scanning device according to claim 2, wherein the position indicating unit further comprises a display provided at the main body casing, and wirelessly receives the signal from the indicating member to display the position of the scanning unit.

4. The image scanning device according to claim 3, wherein the display interacts with the indicating member with a magnetic force to display the moving position of the scanning unit.

5. The image scanning device according to claim 4, wherein the indicating member comprises a magnet which is disposed at the scanning unit.

6. The image scanning device according to claim 4, wherein the indicating member comprises a magnet which is disposed at the main body casing, and has a rod shape elongated in a moving direction of the scanning unit.

7. The image scanning device according to claim 6, wherein the display comprises a coil which is disposed at the scanning unit, and is wound around the magnet to move relative to the magnet to form an induced current.

8. The image scanning device according to claim 4, wherein the indicating member comprises a magnet which is disposed at the scanning unit, and
the display comprises a sheet which is disposed at an outer side of the main body casing along a moving path of the magnet, and allows color of the position of the sheet to be changed with a change of the magnetic force received by the magnet.

9. The image scanning device according to claim 3, wherein the indicating member comprises:
a light source which is disposed at the main body casing, and
a reflecting member which is coupled to the scanning unit to reflect a light beam from the light source.

10. The image scanning device according to claim 9, wherein the display comprises a window which is formed to the main body casing along a moving path of the scanning unit to receive the light beam which is reflected by the reflecting member.

11. A multifunction apparatus, comprising:
an image forming device which forms an image on a printing medium; and
an image scanning device to scan an image of a target object including a main body casing, a scanning unit which is movably disposed at the main body casing, and a position indicating unit to wirelessly determine a position of the scanning in response to moving the scanning unit in the main body casing to display position information of the scanning unit received wirelessly based on the determine position.

12. An image scanning device comprising:
a transparent plate including a first surface on which to place a document;
a sensor array moveable along a second surface of the transparent plate to sense image information of a document; and
a user interface positioned on an exterior of the image scanning device to wirelessly receive position information regarding a position of the sensor array and to display the position information.

13. The image scanning device of claim 12, further comprising:
a magnet connected to the sensor array to move with a fixed positional relationship with the sensor array;
wherein the user interface receives position information in the form of a magnetic field from the magnet.

14. The image scanning device of claim 13, wherein the user interface comprises a guide and a body reactive to the magnetic field moveably positioned within the guide.

15. The image scanning device of claim 12, further comprising:
a light source connected to the sensor array to move with a fixed positional relationship with the sensor array;
wherein the user interface includes a window in a external housing of the image scanning device to transmit light from the light source external to the image scanning device.

16. The image scanning device of claim 15, wherein the window of the image scanning device includes a transparent material.

17. The image scanning device of claim 15, wherein the window of the image scanning device includes a translucent material.

18. The image scanning device of claim 12, further comprising:
a light source emitting a light beam mounted within an external housing of the image scanning device to have a fixed positional relationship to the housing; and
a mirror mounted to the sensor array to have a fixed positional relationship with the sensor array to receive the light beam from the light source and redirect the light beam;
wherein the user interface includes a window in the external housing of the image scanning device to transmit light from the light beam redirected by the mirror.

19. The image scanning device of claim 18, further comprising:
an opaque material positioned between the sensor array and the mirror; and
a bracket connecting the sensor array and the mirror.

20. A method of displaying a position of a sensor array of an image scanning device comprising:
moving the sensor array to scan a document positioned on a scanning bed with a source of electrical power received external to the scanning device;
moving a device connected to the sensor array with a fixed positional relationship to generate a position signal, the device being electrically isolated from the source of electrical power;
wirelessly transmitting the position signal;
wirelessly receiving the transmitted position signal; and
displaying a position of the sensor array as a function of the received position signal.

* * * * *